United States Patent
Turnbull et al.

(10) Patent No.: US 9,908,474 B2
(45) Date of Patent: Mar. 6, 2018

(54) DRIVE CIRCUIT FOR AN ELECTRO-OPTIC REARVIEW MIRROR SYSTEM

(71) Applicant: Gentex Corporation, Zeeland, MI (US)

(72) Inventors: Robert R. Turnbull, Holland, MI (US); G. Bruce Poe, Hamilton, MI (US)

(73) Assignee: GENTEX CORPORATION, Zeeland, MI (US)

( * ) Notice: Subject to any disclaimer, the term of this patent is extended or adjusted under 35 U.S.C. 154(b) by 483 days.

(21) Appl. No.: 14/163,470

(22) Filed: Jan. 24, 2014

(65) Prior Publication Data

US 2014/0209790 A1    Jul. 31, 2014

Related U.S. Application Data

(60) Provisional application No. 61/756,544, filed on Jan. 25, 2013, provisional application No. 61/763,232, filed on Feb. 11, 2013.

(51) Int. Cl.
*B60R 1/08*    (2006.01)
*G02F 1/163*    (2006.01)

(52) U.S. Cl.
CPC ............. *B60R 1/088* (2013.01); *G02F 1/163* (2013.01)

(58) Field of Classification Search
CPC .. B60R 1/088; B60R 1/08; B60R 1/02; B60R 1/006; G02F 1/163
See application file for complete search history.

(56) References Cited

U.S. PATENT DOCUMENTS

| 5,193,029 A | * | 3/1993 | Schofield | B60Q 1/14 |
| | | | | 250/200 |
| 5,220,317 A | | 6/1993 | Lynam et al. | |
| 5,424,898 A | * | 6/1995 | Larson | B60R 1/088 |
| | | | | 361/101 |
| 5,457,450 A | | 10/1995 | Deese et al. | |
| 6,084,700 A | | 7/2000 | Knapp et al. | |

(Continued)

FOREIGN PATENT DOCUMENTS

RU    2396583    8/2010

OTHER PUBLICATIONS

Patent Cooperation Treaty, International Searching Authority, International Search Report, Written Opinion of the International Searching Authority and Notification of Transmittal, dated Jun. 5, 2014, 8 Pages.

*Primary Examiner* — Georgia Y Epps
*Assistant Examiner* — Don Williams
(74) *Attorney, Agent, or Firm* — Price Heneveld LLP; Bradley D. Johnson

(57) ABSTRACT

An electro-optic rearview mirror system is provided. The electro-optic rearview mirror system includes an inside electro-optic rearview mirror element and an outside electro-optic rearview mirror element in series with the inside electro-optic rearview mirror element. A drive circuit is in electrical communication with the inside electro-optic rearview mirror element and the outside electro-optic rearview mirror element and includes a first power operational amplifier and a second power operational amplifier, both of which are configured as voltage followers. The drive circuit is configured to apply overvoltage to the inside electro-optic rearview mirror element if the outside electro-optic rearview mirror element is shorted.

20 Claims, 14 Drawing Sheets

(56) References Cited

U.S. PATENT DOCUMENTS

| | | |
|---|---|---|
| 6,305,807 B1 | 10/2001 | Schierbeek |
| 6,819,467 B2 | 11/2004 | Lynam |
| 6,936,807 B1 * | 8/2005 | Su .......................... B60R 1/088 |
| | | 250/214 R |
| 7,215,318 B2 | 5/2007 | Turnbull et al. |
| 8,363,004 B2 | 1/2013 | Ye et al. |
| 8,487,545 B2 | 7/2013 | Bhagat |
| 8,526,094 B2 | 9/2013 | Letocart |
| 2007/0182248 A1 | 8/2007 | Blaker et al. |
| 2008/0043005 A1 | 2/2008 | Kanda |
| 2011/0227503 A1 | 9/2011 | Yuan et al. |
| 2013/0207558 A1 | 8/2013 | Xu et al. |

* cited by examiner

DRIVE CIRCUIT FOR AN ELECTRO-OPTIC REARVIEW MIRROR SYSTEM

CROSS-REFERENCE TO RELATED APPLICATIONS

This application claims priority to and the benefit under 35 U.S.C. § 119(e) of U.S. Provisional Patent Application No. 61/756,544, filed on Jan. 25, 2013, entitled "INTEGRATED SERIES DRIVE CIRCUIT," and U.S. Provisional Patent Application No. 61/763,232, filed on Feb. 11, 2013, entitled "DRIVE CIRCUIT FOR AN ELECTRO-OPTIC REARVIEW MIRROR SYSTEM," the entire disclosures of which are hereby incorporated herein by reference.

FIELD OF THE INVENTION

The present invention generally relates to an electro-optic system, and more particularly, an electro-optic system for use in a rearview mirror assembly of a vehicle.

SUMMARY OF THE INVENTION

According to one aspect of the present invention, an electro-optic rearview mirror system is provided. The electro-optic rearview mirror system includes an inside electro-optic rearview mirror element and an outside electro-optic rearview mirror element electrically connected in series with the inside electro-optic rearview mirror element. A drive circuit is in electrical communication with the inside electro-optic rearview mirror element and the outside electro-optic rearview mirror element and includes a first power operational amplifier and a second power operational amplifier, both of which are configured as voltage followers. The drive circuit is configured to apply overvoltage to the inside electro-optic rearview mirror element if the outside electro-optic rearview mirror element is shorted.

According to another aspect of the present invention, an electro-optic rearview mirror system is provided. The electro-optic rearview mirror system includes an inside electro-optic rearview mirror element and an outside electro-optic rearview mirror element electrically connected in series with the inside electro-optic rearview mirror element. A drive circuit is in electrical communication with the inside electro-optic rearview mirror element and the outside electro-optic rearview mirror element. The drive circuit is configured to differentially sense a voltage associated with the inside electro-optic rearview mirror element such that if the outside electro-optic rearview mirror element is shorted, a voltage associated with the inside electro-optic rearview mirror element remains substantially unchanged.

According to another aspect of the present invention, an electro-optic rearview mirror system is provided and includes a drive circuit for driving an inside electro-optic rearview mirror element and at least one outside electro-optic rearview mirror element of a vehicle, the vehicle having an ambient light sensor and a glare light sensor. The drive circuit includes a controller responsive to outputs of the ambient light sensor and the glare light sensor for generating voltage control signals, the controller further generating a selection signal for alternatingly selecting one of the inside and outside electro-optic rearview mirror elements. The drive circuit also includes a variable voltage source for generating a drive voltage. The drive circuit further includes a selection circuit coupled to the variable voltage source for receiving the drive voltage. The selection circuit is also coupled to the controller for receiving the selection signal and is further coupled to the inside electro-optic rearview mirror element and the outside electro-optic rearview mirror element for selectively supplying the drive voltage thereto in response to the selection signal.

These and other features, advantages, and objects of the present invention will be further understood and appreciated by those skilled in the art by reference to the following specification, claims, and appended drawings.

BRIEF DESCRIPTION OF THE DRAWINGS

The present invention will become more fully understood from the detailed description and the accompanying drawings, wherein.

DETAILED DESCRIPTION

Figure 1:
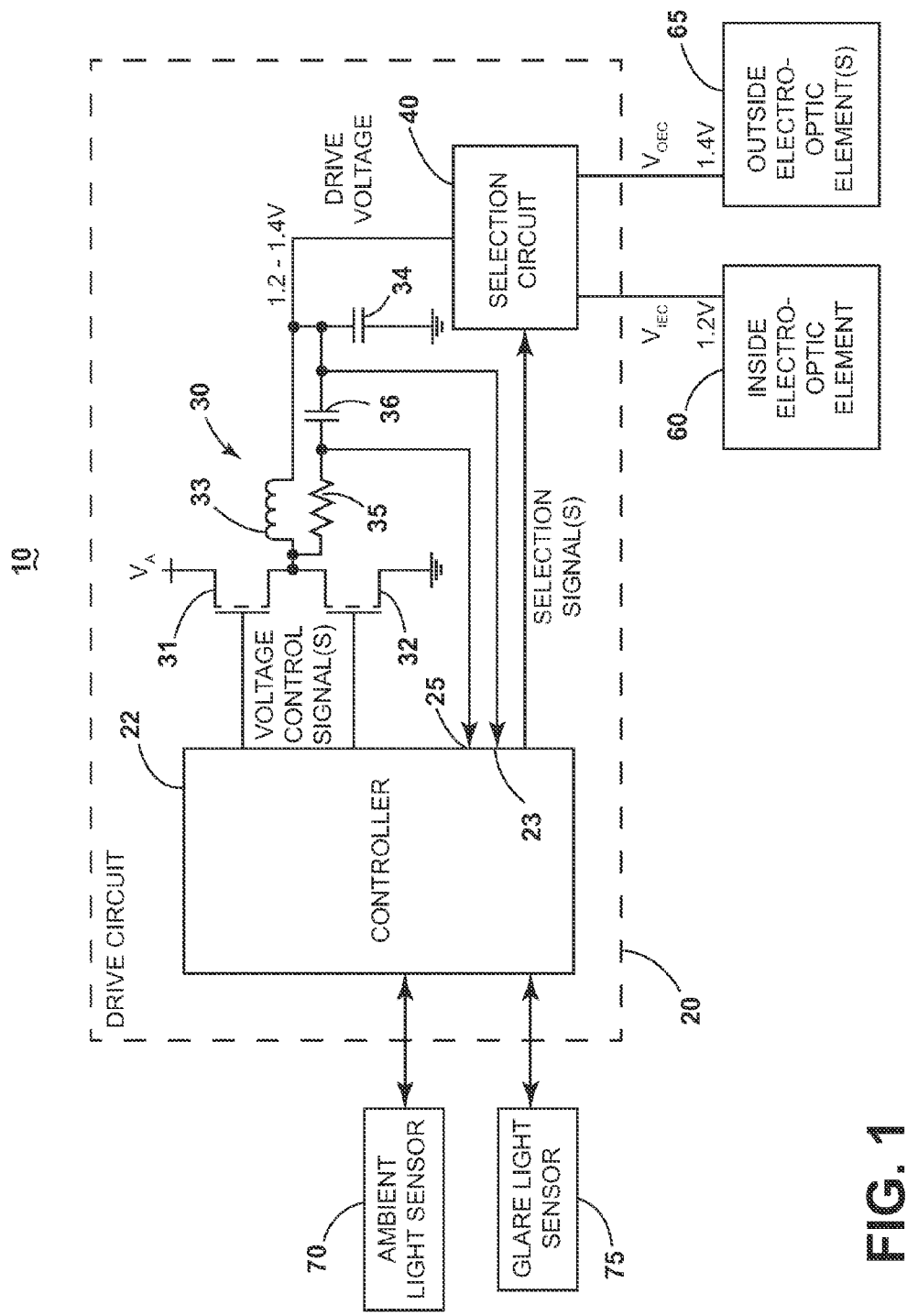
FIG. 1 is an electrical circuit diagram in block and schematic form of an electro-optic rearview mirror system of a vehicle in which the inventive drive circuit is implemented.

The present illustrated embodiments reside primarily in combinations of method steps and apparatus components related to an electro-optic system. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Further, like numerals in the description and drawings represent like elements.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Referring to FIG. 1, one embodiment of an electro-optic rearview mirror system 10 of a vehicle is shown in which a drive circuit 20 is implemented. In addition to drive circuit 20, electro-optic rearview mirror system 10 includes an inside electro-optic rearview mirror element 60, at least one outside electro-optic rearview mirror element 65, an ambient light sensor 70, and a glare light sensor 75. Drive circuit 20 may include a controller 22 responsive to outputs of ambient light sensor 70 and glare light sensor 75 for generating voltage control signals. Controller 22 is further configured to generate a selection signal for alternatingly selecting one of the inside and outside electro-optic rearview mirror elements 60 and 65. Drive circuit 20 further includes a variable voltage source 30 for generating a drive voltage, and a selection circuit 40 coupled to the variable voltage source 30 for receiving the drive voltage. Selection circuit 40 is also coupled to controller 22 for receiving the selection signal. Selection circuit 40 is further coupled to the inside electro-optic rearview mirror element 60 and the outside electro-optic rearview mirror element 65 for selectively supplying the drive voltage thereto in response to the selection signal.

Variable voltage source 30 includes a first power transistor 31 and a second power transistor 32 connected in series with one another between a supplied voltage $V_A$ and ground. The gates of the two power transistors are each coupled to controller 22 so as to receive the voltage control signals. A node is provided between first and second power transistors 31 and 32 to which a first terminal of an inductor 33 is coupled. A second terminal of inductor 33 is coupled to selection circuit 40 and to a first terminal of a first capacitor 34, which has a second terminal coupled to ground. The voltage across first capacitor 34 is the drive voltage that is supplied to selection circuit 40. Variable voltage source 30 may optionally include a resistor 35 and a second capacitor 36 coupled in series between the node between first and second power transistors 31 and 32 and the first terminal of first capacitor 34 (effectively in parallel with inductor 33). The first terminal of first capacitor 34 is coupled to an input terminal 23 of controller 22 so that controller 22 can monitor the drive voltage. Also, another input terminal 25 of controller 22 may be coupled between resistor 35 and second capacitor 36 in order to monitor current.

Controller 22 controls variable voltage source 30 to selectively vary the drive voltages to be applied to electro-optic mirror elements 60 and 65 by controlling the duty cycles of first and second power transistors 31 and 32 using the voltage control signals. The drive voltage may be increased by supplying a voltage control signal increases the duty cycle of first power transistor 31 until the voltage read at input terminal 23 of controller 22 is at the desired drive voltage. Likewise, the drive voltage may be decreased by supplying a voltage control signal that increases the duty cycle of second power transistor 32 until the voltage read at input terminal 23 of controller 22 is at the desired drive voltage.

Figure 4:
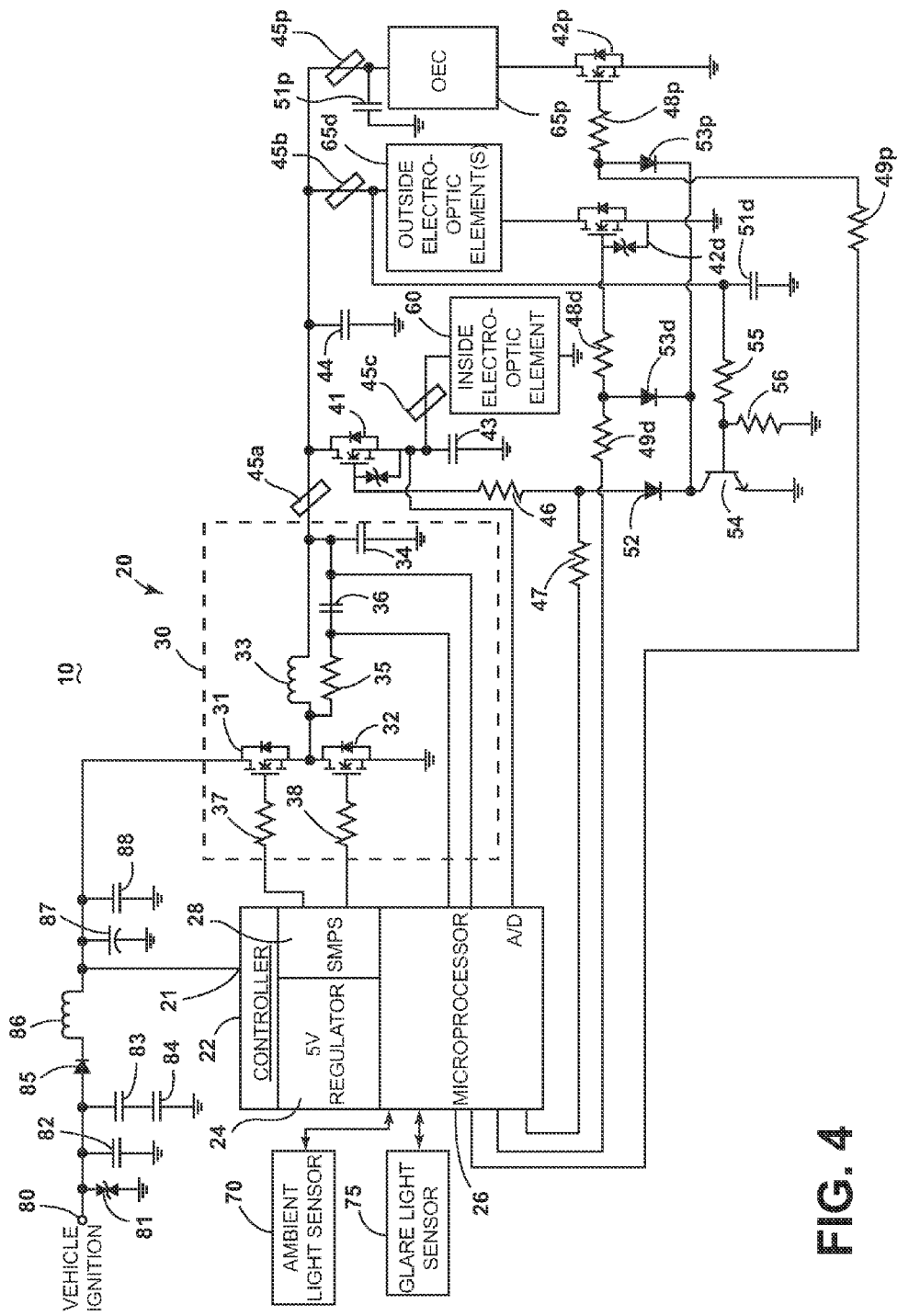
FIG. 4 is an electrical circuit diagram in block and schematic form of an electro-optic rearview mirror system of a vehicle according to a second embodiment in which the inventive drive circuit may be implemented.

If more than one outside electro-optic mirror element 65 is provided (i.e., one for the driver-side outside mirror and one for the passenger-side outside mirror, the second electro-optic mirror element is coupled in parallel with the first as shown in FIG. 4 in which the components associated driver side outside mirror element 65d are labeled with a "d" suffix and the components associated passenger side outside mirror element 65p are labeled with a "p" suffix.

Figure 2:
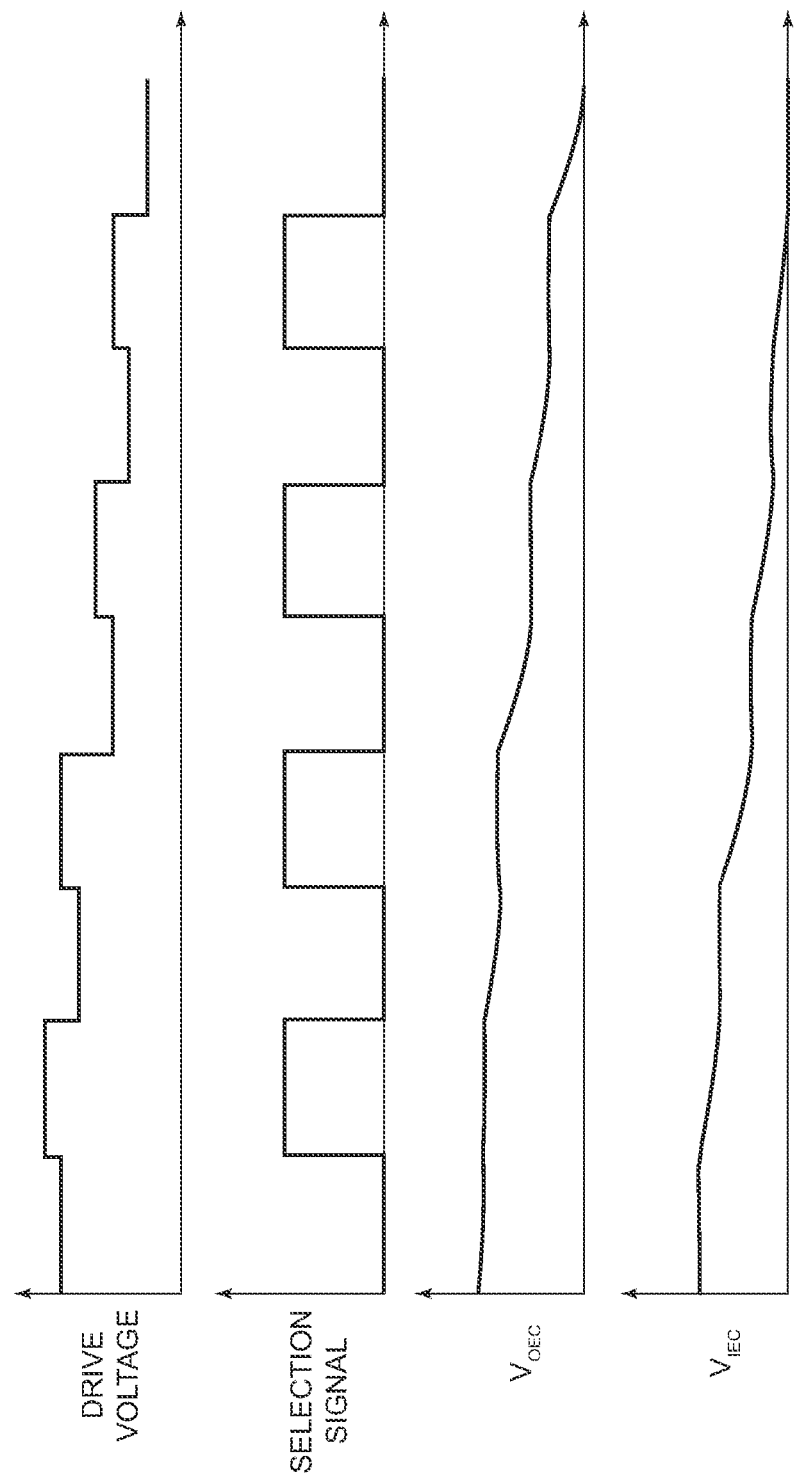
FIG. 2 is a timing diagram showing examples of a drive voltage and a selection signal as well as the resulting inside electro-optic drive voltage $V_{IEC}$ and outside electro-optic drive voltage $V_{OEC}$ that may be present in the circuit shown in FIG. 1.

FIG. 2 shows examples of a drive voltage and a selection signal as well as the resulting inside electro-optic drive voltage $V_{IEC}$ and outside electro-optic drive voltage $V_{OEC}$. As shown, the selection signal is a periodic square wave signal with a fixed fifty percent duty cycle. The square wave signal may have any length period, although shorter periods are beneficial in that they produce smaller inrush current, but if too short of a period, can produce more unwanted electromagnetic interference (EMI) as the pulsed signals are transmitted a considerable distance to the outside mirror(s) 65. A period of 100 milliseconds, for example, has shown to be effective. Selection circuit 40 may effectively function as a multiplexer that, for example, may direct the drive voltage to outside electro-optic mirror element 65 when the selection signal is low and to direct the drive voltage to inside electro-optic mirror element 60 when the selection signal is high. As also shown in FIG. 2, the voltage level of the drive voltage may be varied to correspond to the desired voltage $V_{IEC}$ to be applied to inside electro-optic mirror element 60 and the desired voltage $V_{OEC}$ to be applied to outside electro-optic mirror element 65. Thus, the electro-optic mirror elements 60 and 65 may be driven with a pulsed voltage signal where the height of each pulse is the voltage at which that element is driven where the elements are allowed to float between pulses. As also apparent from FIG. 2, the drive voltages $V_{IEC}$ and $V_{OEC}$ for the inside and outside electro-optic mirror elements 60 and 65 may differ. As should be appreciated, the selection signal as well as the selection circuit may take many different forms.

Figure 3:
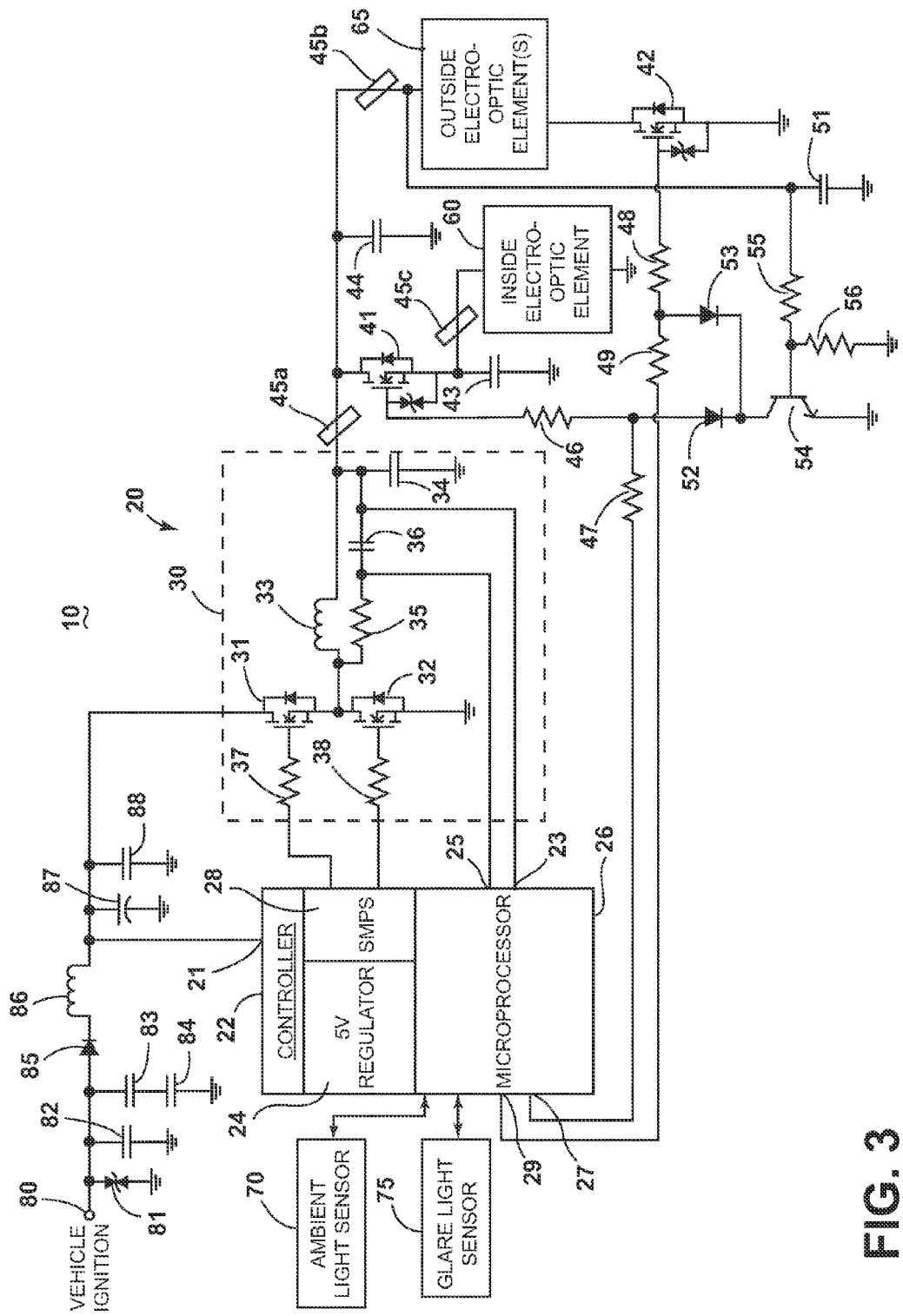
FIG. 3 is an electrical circuit diagram in block and schematic form of an electro-optic rearview mirror system of a vehicle according to a first embodiment in which the inventive drive circuit may be implemented.

FIG. 3 shows a more specific embodiment of the drive control circuit 20. In this example, controller 22 may be a controller that includes a microprocessor 26, a switch mode power supply 28, and a 5 volt regulator 24, which may all be included in the same integrated circuit chip. Such a controller 20 provides the advantages that allows variable voltage source 30 to provide drive voltages between 1.4 V and 0.3 V or even 0 V by completely discharging first capacitor 34. This form of controller 20 eliminates or at least reduces the need for a resistive voltage divider or separate drive topology thereby reducing current consumption, the parts count, and circuit size while also increasing efficiency.

Power transistors 31 and 32 may be implemented using FETs such as an N-channel MOSFET. Resistors 37 and 38 may be added to the path between controller 22 and the gates of power transistors 31 and 32, respectively. Resistors 37 and 38 may have a resistance of 10Ω, for example. Other exemplary values for the components of variable voltage source 30 include an inductance of 15 μH for inductor 33, a capacitance of 10 μF for first capacitor 34, a capacitance of 0.001 μF for second capacitor 36, and a resistance of 3.9Ω for resistor 35.

FIG. 3 also shows an example of a selection circuit 40 that may be used. Selection circuit 40 includes a first selection switch 41 for selectively enabling the drive voltage to be applied across inside electro-optic mirror element 60 and a second selection switch 42 for selectively enabling the drive voltage to be applied across outside electro-optic mirror element 65. In the particular implementation shown, first selection switch 41 is disposed between the first terminal of first capacitor 34 and inside electro-optic mirror element 60, whereas second selection switch 42 is disposed between outside electro-optic mirror element 65 and ground. Both selection switch positions are sufficient to disrupt current from flowing though the respective electro-optic elements. Accordingly switches 41 and 42 could be disposed such that either or both switches are disposed between the corresponding electro-optic elements and ground or between the first terminal of first capacitor 34 and the corresponding electro-optic elements. Alternatively each electro-optic element may have two corresponding selection switches with one provided on the power side thereof and the other provided on the ground side thereof. Second selection switch 42 is shown on the ground side, which helps protect from a reverse polarity connection or "short to battery" condition. The electro-optic elements may each also be driven with respective sets 90 and 92 of four switches in an H-bridge configuration to allow application of reverse voltage pulses for better clearing speed as shown in the alternative embodiment of FIG. 5.

Multiple outside elements may be driven with different voltages by adding additional switches and selection periods. For example by adding an additional switch in series with an additional element and a third selection period, the inside element, driver side element and passenger side element may be driven to three distinct voltages and therefore three different reflectance levels.

First and second selection switches 41 and 42 may be implemented using an N-Channel MOSFET. The gates of selection switches 41 and 42 may be coupled to output terminals 27 and 29, respectively, of controller 22 to receive selection signals. The selection signals may consist of a selection signal such as shown in FIG. 2 and an inverted version of that selection signal so that only one of the two selection switches is conducting at any one time. On the other hand, providing two separate selection signals allows controller 22 to control switches 41 and 42 such that neither one is conducting or that both are conducting as may be the case when clearing both electro-optic elements at once. Further, if it is detected that an outside electro-optic mirror element 65 is shorted, controller 22 may stop attempting to apply a drive voltage to the outside element by not providing a selection signal to second selection switch 42.

The gate of first selection switch 41 may be coupled to output terminal 27 of controller 22 via a pair of resistors 46 and 47. Similarly, the gate of second selection switch 42 may be coupled to output terminal 29 of controller 22 via a pair of resistors 48 and 49. Capacitors 43 and 44 are respectively coupled in parallel with inside and outside electro-optic mirror elements 60 and 65, respectively.

Ferrite beads or inductors 45a, 45b and 45c are used for EMC protection. Capacitors 43, 44 and 51 are also used for EMC protection and may have a value of 0.1 uF.

Figure 5:
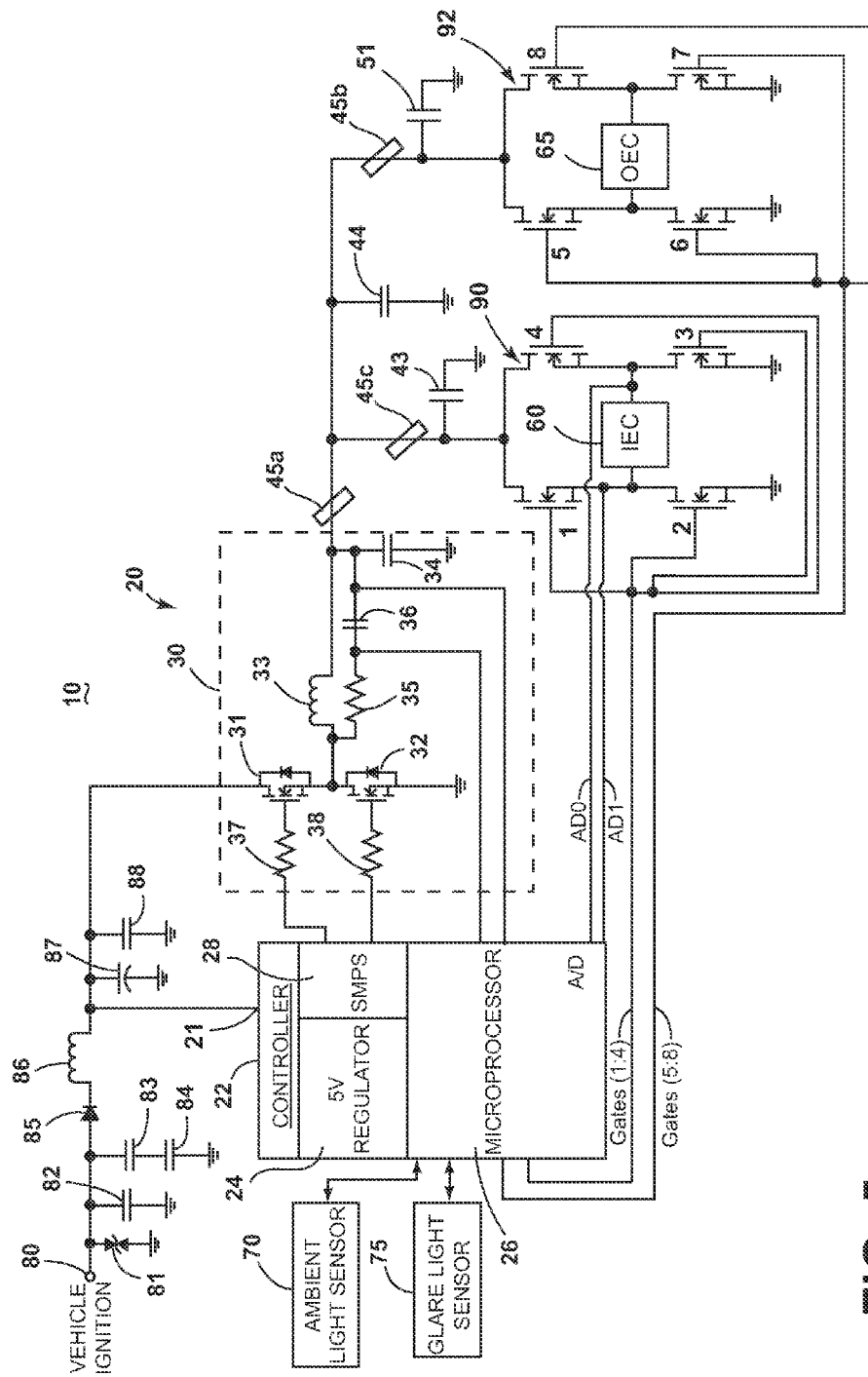
FIG. 5 is an electrical circuit diagram in block and schematic form of an electro-optic rearview mirror system of a vehicle according to a third embodiment in which the inventive drive circuit may be implemented.

The microprocessor 26 may optionally monitor the open circuit and driven voltages of the electro-optic elements using comparators or A/D converter channels. The comparators or A/D channels may be used in single ended mode if one electro-optic element terminal is grounded or differentially if the low voltage side of the element is switched or the element is driven by an H-bridge as shown in FIG. 5.

A protection circuit is shown that includes a transistor 54, a first diode 52, a second diode 53, a first resistor 55, and a second resistor 56. First diode 52 is coupled between the collector of transistor 54 and the gate of first selection switch 41 via resistor 46. Second diode 53 is coupled between the collector of transistor 54 and the gate of second selection switch 42 via resistor 48. The emitter of transistor 54 is coupled to ground. The base of transistor 54 is coupled to the positive terminal of outside electro-optic mirror element 65 via the first resistor 55 and to ground via the second resistor 56. In operation, if outside electro-optic mirror element 65 is shorted, the voltage at the base of transistor 54 is changed such that transistor 54 conducts current, thereby pulling the gates of selection switches 41 and 42 to ground, which prevents them from conducting and applying drive voltages to electro-optic mirror elements 60 and 65.

Drive circuit 20 may further include various circuit components coupled between a vehicle ignition input terminal 80 and the voltage input terminal 21 of controller 22 and between vehicle ignition and the source of first power transistor 31. These circuit components include a metal oxide varistor (MOV) 81 and a first capacitor 82 coupled in parallel with one another between the vehicle ignition terminal 80 and ground. In addition, a second capacitor 83 and a third capacitor 84 are coupled in series with one another between vehicle ignition terminal 80 and ground. Also coupled to vehicle ignition terminal 80 is an anode of a diode 85. The cathode of diode 85 is coupled to a first terminal of an inductor 86. A second terminal of inductor 86 is coupled to input terminal 21 of controller 22 as well as to fourth and fifth capacitors 87 and 88 and to the source of first power transistor 31. Fourth and fifth capacitors 87 and 88 are coupled in parallel with each other and to ground.

The drive circuit 20 may further include a watchdog circuit and a bus interface for coupling to the vehicle bus so that various information may be received and transmitted to other components of the vehicle. For example, diagnostic information may be transmitted from the drive circuit 20 as well as various alerting signals such as an improper connection or short of the outside mirror elements 65, while information such as a reverse inhibit signal may be received over the bus. The watchdog circuit may, for example, reboot the controller 22 if the duty cycle of the selection signal(s) went above a certain percentage.

Electro-optic rearview mirror elements 60 and 65 may take various forms including that of an electrochromic mirror element that changes from a relative clear state at 0 V to a colored low transmittance state at a higher voltage, of for example, 1.4 V. Ambient and glare light sensors 70 and 75 may be constructed as disclosed in U.S. Pat. Nos.

6,359,274 and 7,543,946, the entire disclosures of which are incorporated herein by reference.

Turning now to FIGS. 6A-7B, another embodiment of an electro-optic rearview mirror system is generally shown at reference identifier 100A, 100A', 100B, 100B'. The electro-optic rearview mirror system 100A, 100A', 100B, 100B' can include an inside electro-optic rearview mirror element 102 and at least one outside electro-optic rearview mirror element 104 electrically connected in series. According to one embodiment, the inside and outside electro-optic rearview mirror elements 102,104 can be electrochromic mirror elements. However, those skilled in the art should appreciate that the inside and outside electro-optic rearview mirror elements 102,104 can be other suitable electro-optic elements. Typically, the electrical power is supplied to the inside and outside electro-optic rearview mirror elements 102,104 to alter a state of the inside and outside electro-optic rearview mirror elements 102,104, respectively (e.g., dim or reduce a reflectance of an auto-dimming, electrochromic mirror).

Figure 6A:
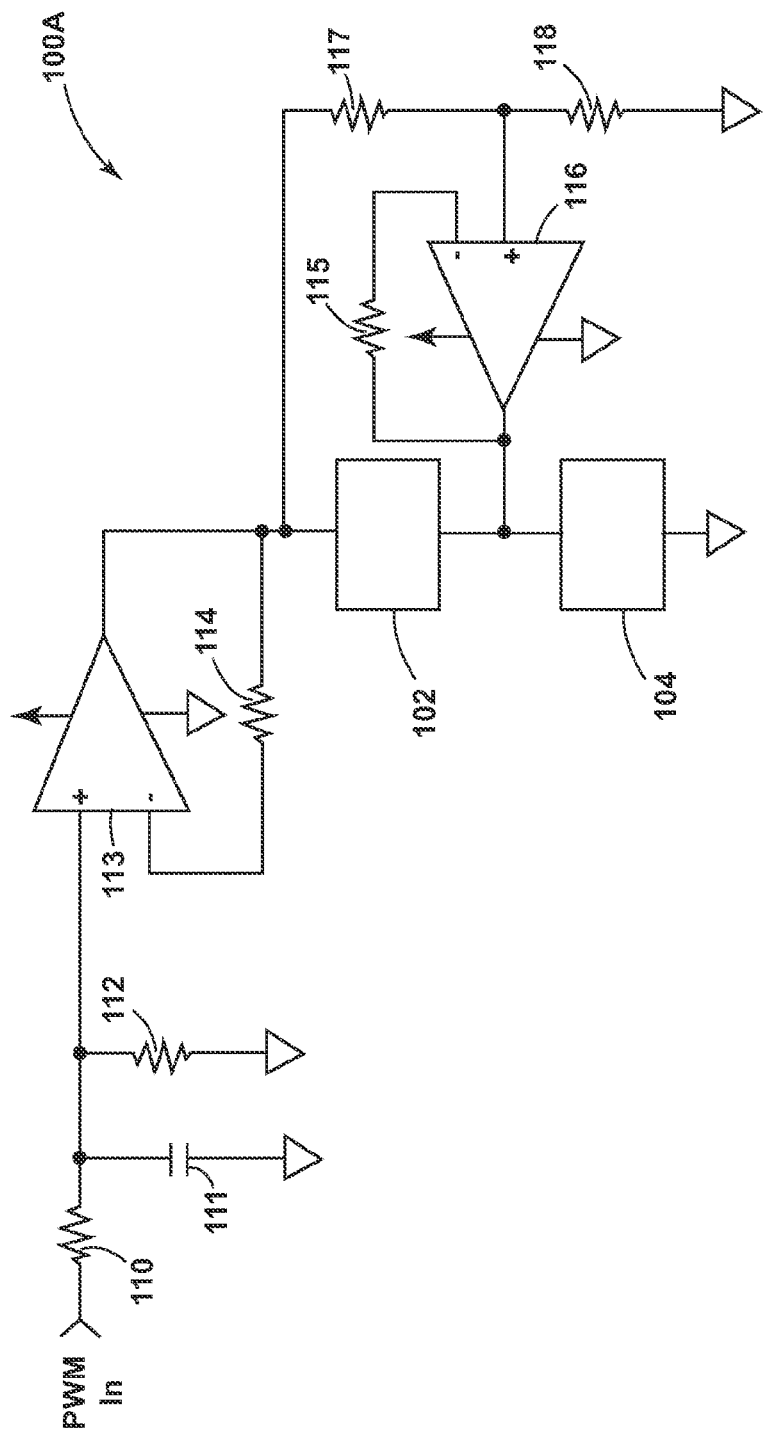
FIG. 6A is a schematic of an electro-optic rearview mirror system having two power operational amplifiers (op-amps) configured as voltage followers, in accordance with one embodiment of the present invention.
Figure 6B:
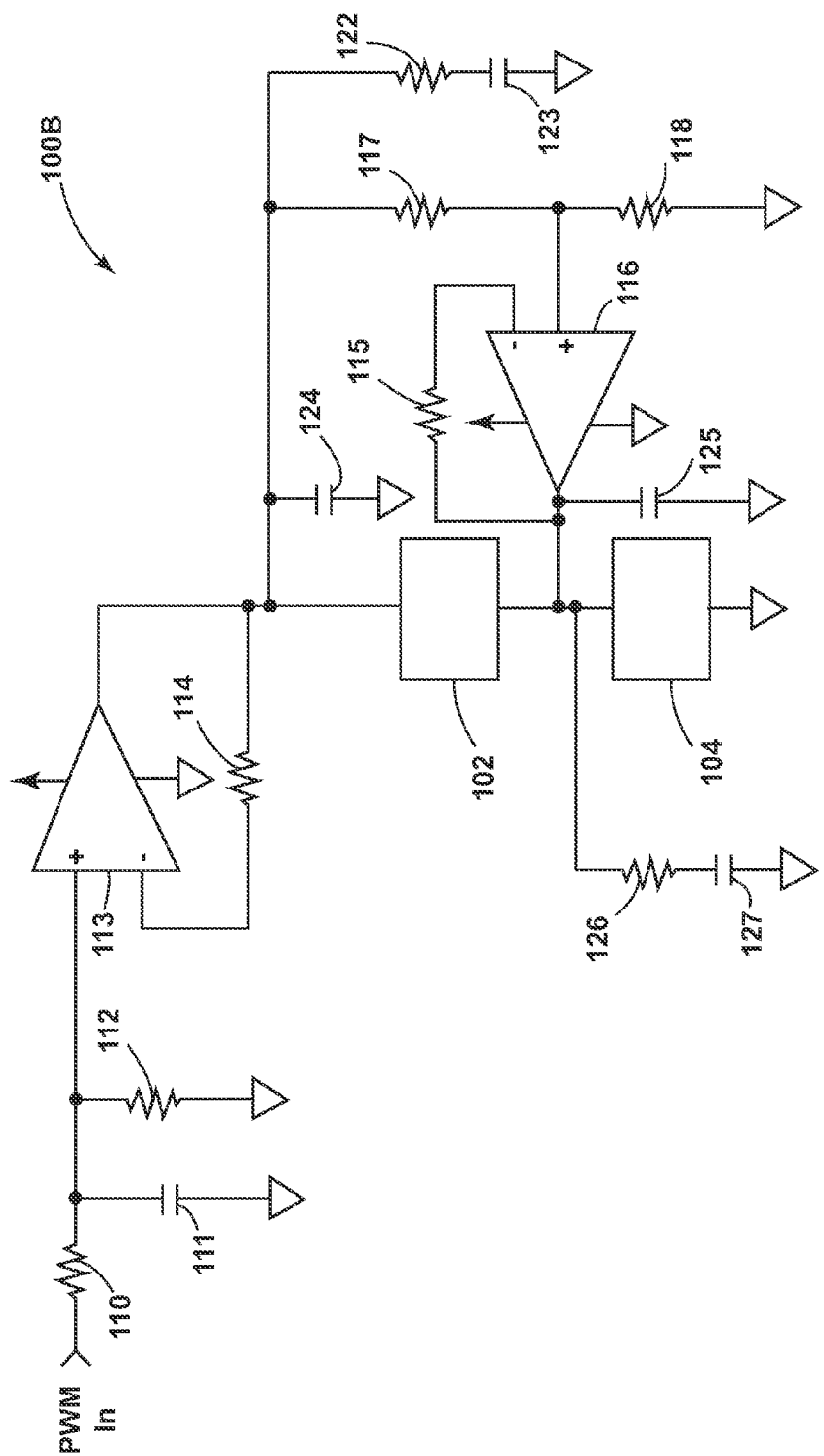
FIG. 6B is a modified schematic of the electro-optic rearview mirror system shown in FIG. 6A, having EMC capacitors and RC dampers, in accordance with one embodiment of the present invention.

With respect to FIGS. 6A and 6B, the electro-optic rearview mirror system 100A, 100B can have two power op-amps, shown as power operational amplifiers (op-amps) 113 and 116, both of which are configured as voltage followers. Such an embodiment can apply overvoltage to the inside electro-optic rearview mirror element 102 if the outside electro-optic rearview mirror element 104 is shorted. Resistors 110 and 112 scale the average value of a pulse-width modulation (PWM) signal (PWM In) such that 100% duty cycle corresponds to a voltage across resistor 112 that is equal to the maximum desired voltage across series-connected electro-optic rearview mirror elements 102 and 104. This voltage is the sum of the desired voltages for the individual electro-optic rearview mirror elements 102,104. Capacitor 111 filters the PWM signal to apply an average DC value to the electro-optic rearview mirror elements 102, 104. Power op-amp 113 buffers this filtered voltage to provide the current required by the electro-optic rearview mirror elements 102, 104. Resistor 114 is optional and provides protection against electrostatic discharge (ESD)/electromagnetic compatibility (EMC) in addition to bias current compensation to reduce the offset voltage of power op-amp 113. Since the current drains of electro-optic rearview mirror elements 102 and 104 are not predictable due to the size of the electro-optic rearview mirror elements 102, 104, production variation, and temperature environment, power op-amp 116 is used to control the voltage at the center point of electro-optic rearview mirror elements 102 and 104. Resistor 115 is optional and provides ESD/EMC protection and bias current compensation to reduce the offset voltage of power op-amp 116. Resistors 117 and 118 split the voltage across electro-optic rearview mirror elements 102 and 104 in the desired proportions to provide a reference for power op-amp 116.

Figure 6C:
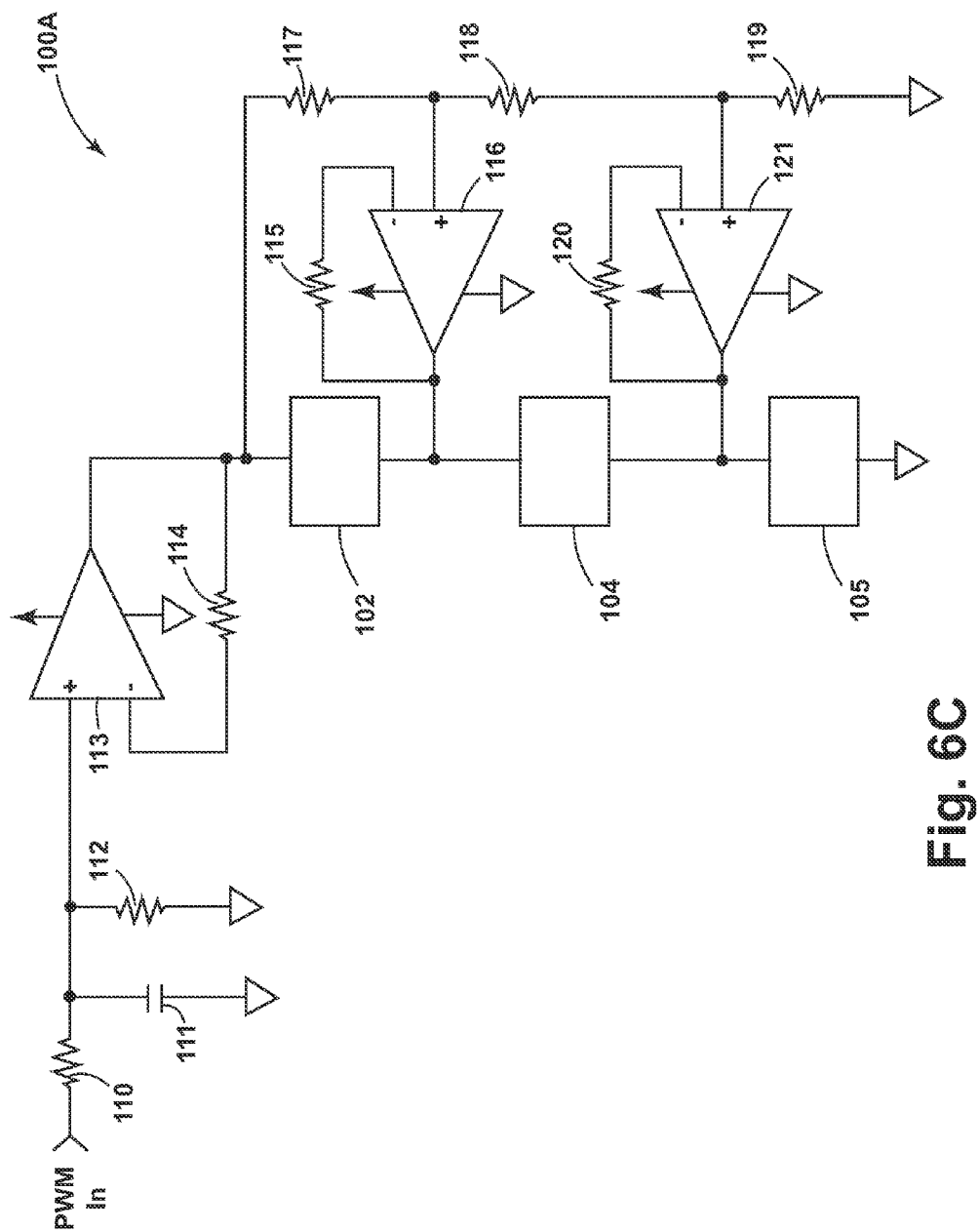
FIG. 6C is a modified schematic of the electro-optic rearview mirror system shown in FIG. 6A, having an additional outside electro-optic rearview mirror element and an additional power op-amp configured as a voltage follower.

In FIG. 6C, the electro-optic rearview system 100A of FIG. 6A is shown having an additional outside electro-optic rearview mirror element 105 electrically connected in series with the ground side of outside electro-optic rearview mirror element 104. An additional power op-amp 121 can be provided to stabilize the additional voltages along the series string. It should be appreciated that additional outside electro-optic rearview mirror elements and power op-amps can be added in like manner. As shown, resistor 119 can be added to provide references for the additional power op-amp 121, which is configured as a voltage follower and stabilizes the voltage at the center point of electro-optic rearview mirror elements 104 and 105. Feedback for power op-amp 121 is provided through optional resistor 120.

Referring back FIG. 6B, the electro-optic system 100B can include capacitors configured to reduce electromagnetic interference (e.g., EMC capacitors) and RC dampers. As shown, capacitors 124 and 125 are added for ESD and EMC protection. Resistor 122 and capacitor 123 form a damping network for amplifier 113, while resistor 126 and capacitor 127 form a damping network for amplifier 116.

Figure 7A:
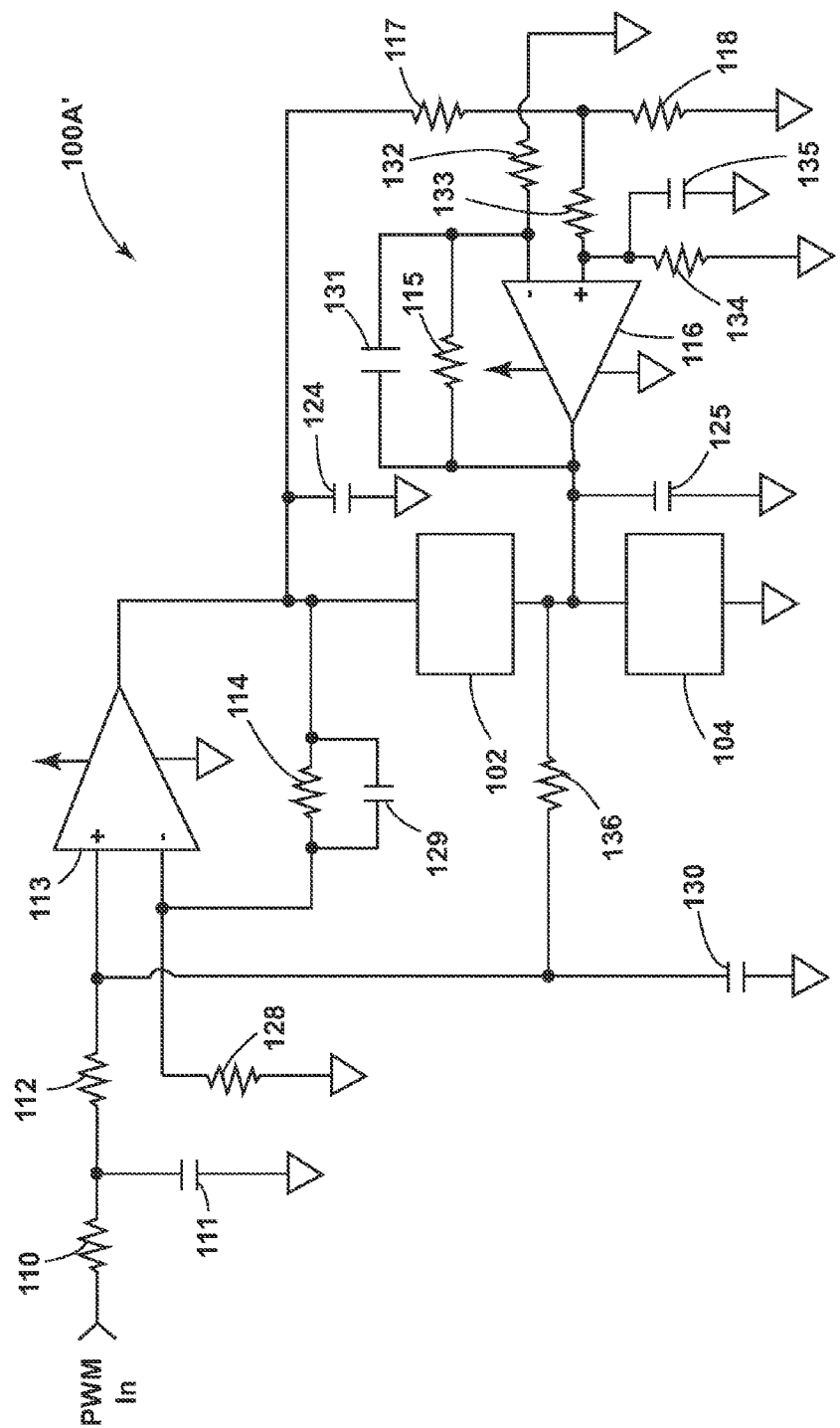
FIG. 7A is a schematic of an electro-optic rearview mirror system having two power op-amps configured as differential amplifiers, in accordance with one embodiment of the present invention.
Figure 7B:
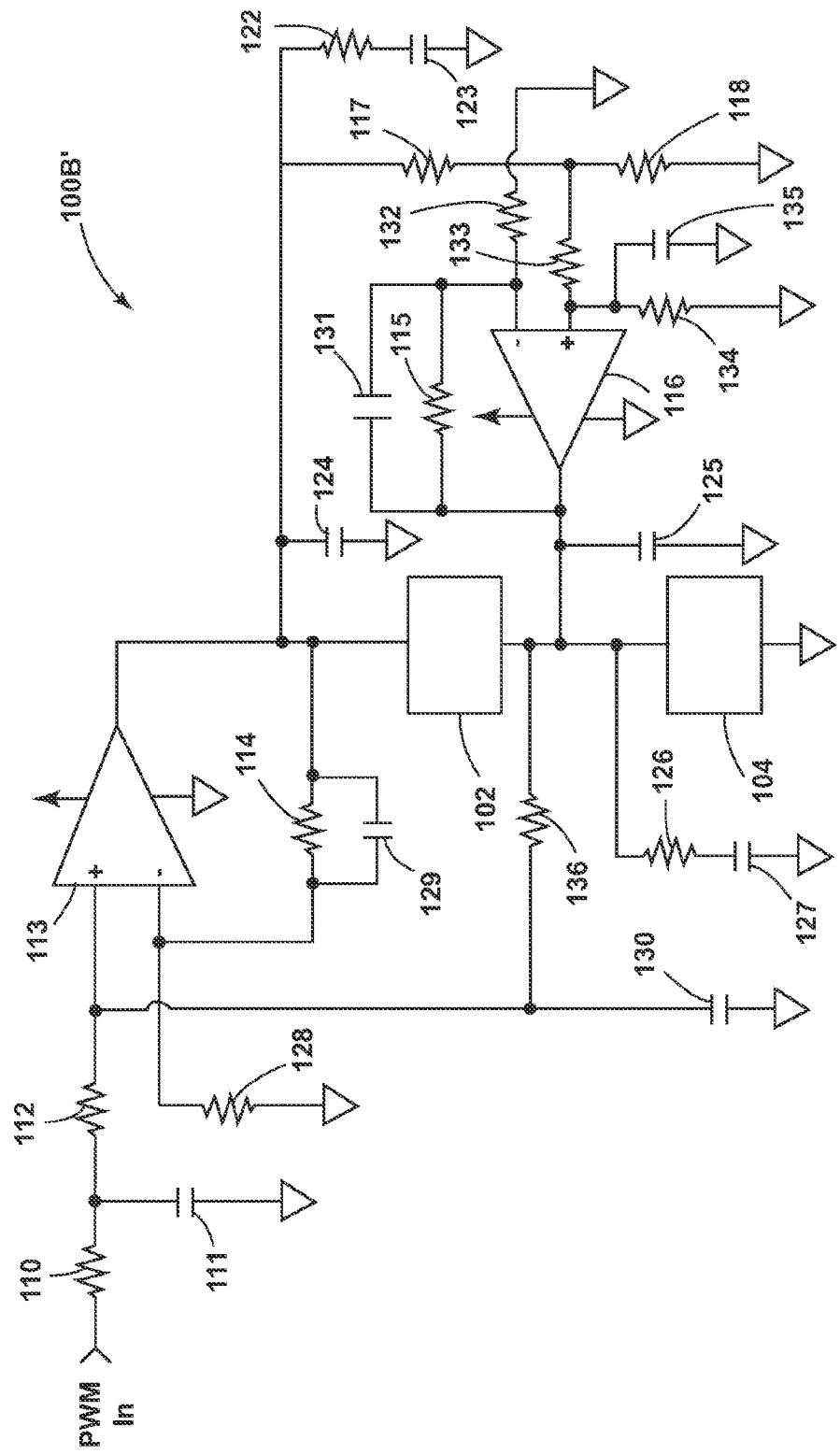
FIG. 7B is a modified schematic of the electro-optic rearview mirror system shown in FIG. 7A, having RC dampers, in accordance with one embodiment of the present invention.

Referring now to FIGS. 7A and 7B, power op-amps 113 and 116 can be configured as differential amplifiers. One or more capacitors, shown as 129, 130, 131, and 135, can be used to control loop bandwidth. Additionally or alternatively, loop bandwidth can be controlled using an RC network having resistors 122 and 126 and capacitors 123 and 127, as shown in FIG. 7B. In either embodiment, capacitors 124 and 125 can be used for EMC and ESD suppression. In operation, the drive circuit of FIGS. 7A and 7B can be configured to differentially sense a voltage of the inside electro-optic rearview mirror element 102 so that if the outside electro-optic rearview mirror element 104 is shorted, the voltage associated with the inside electro-optic rearview mirror element 102 remains substantially unchanged. In the illustrated embodiment, resistors 110, 112, 128, 114, and 136 work in conjunction with power op-amp 113 to form a differential amplifier and resistors 115, 132, 133, and 134 work in conjunction with power op-amp 116 to form a second differential amplifier. With respect to the electro-optic rearview mirror systems 100B, 100B' shown in FIGS. 7A and 7B, it should be appreciated that each one can be configured to approximately maintain stability at varying temperatures.

According to any of the embodiments described in FIGS. 6A-7B, a separate clear signal is not required, such that an input PWM duty cycle (via PWM In) or DAC voltage can be reduced to approximately zero volts to initiate clearing of the inside and outside electro-optic rearview mirror elements 102, 104.

Figure 8A:
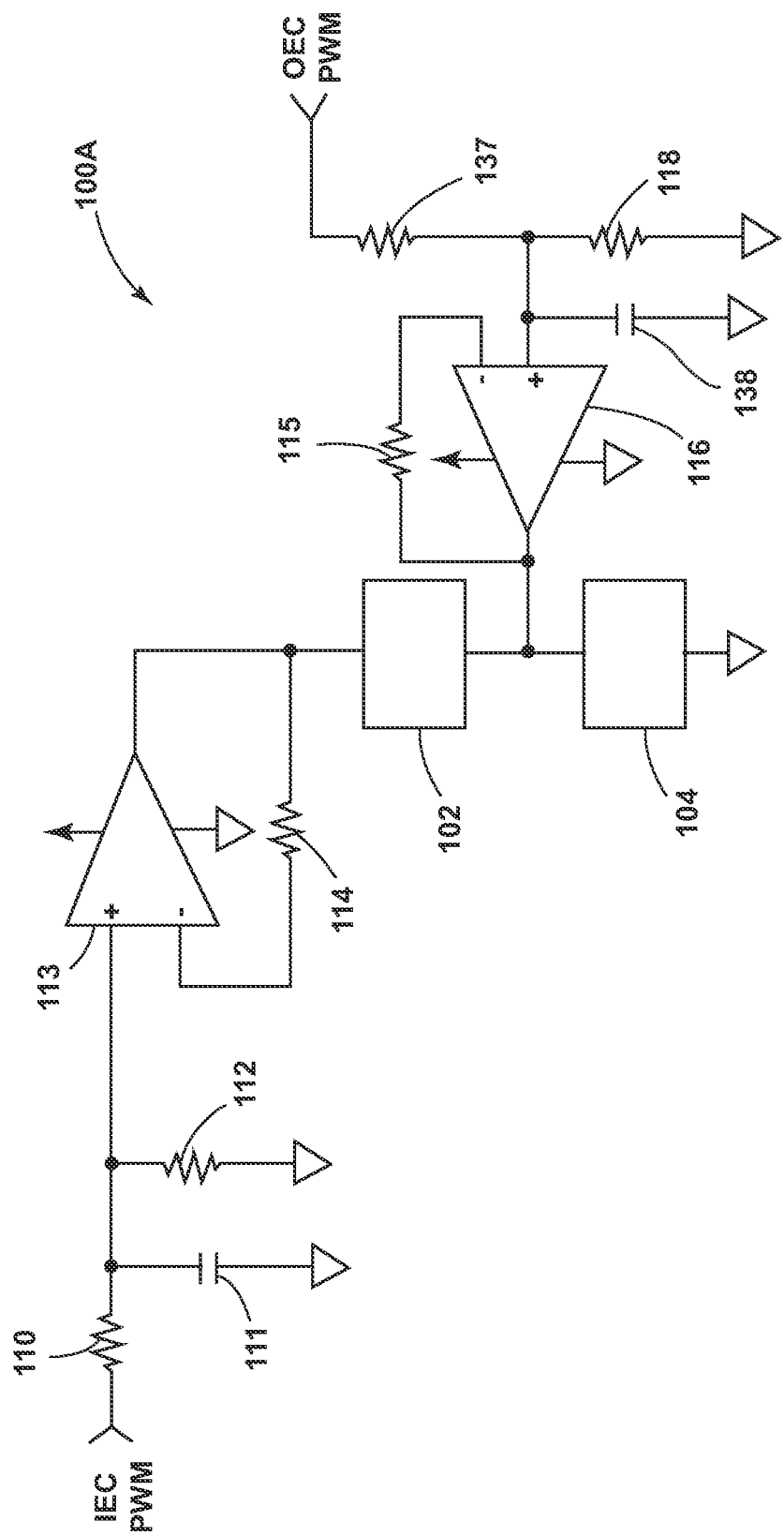
FIG. 8A is a modified schematic of the electro-optic rearview mirror system shown in FIG. 6A, having two separate PWM signals, in accordance with one embodiment of the present invention.
Figure 8B:
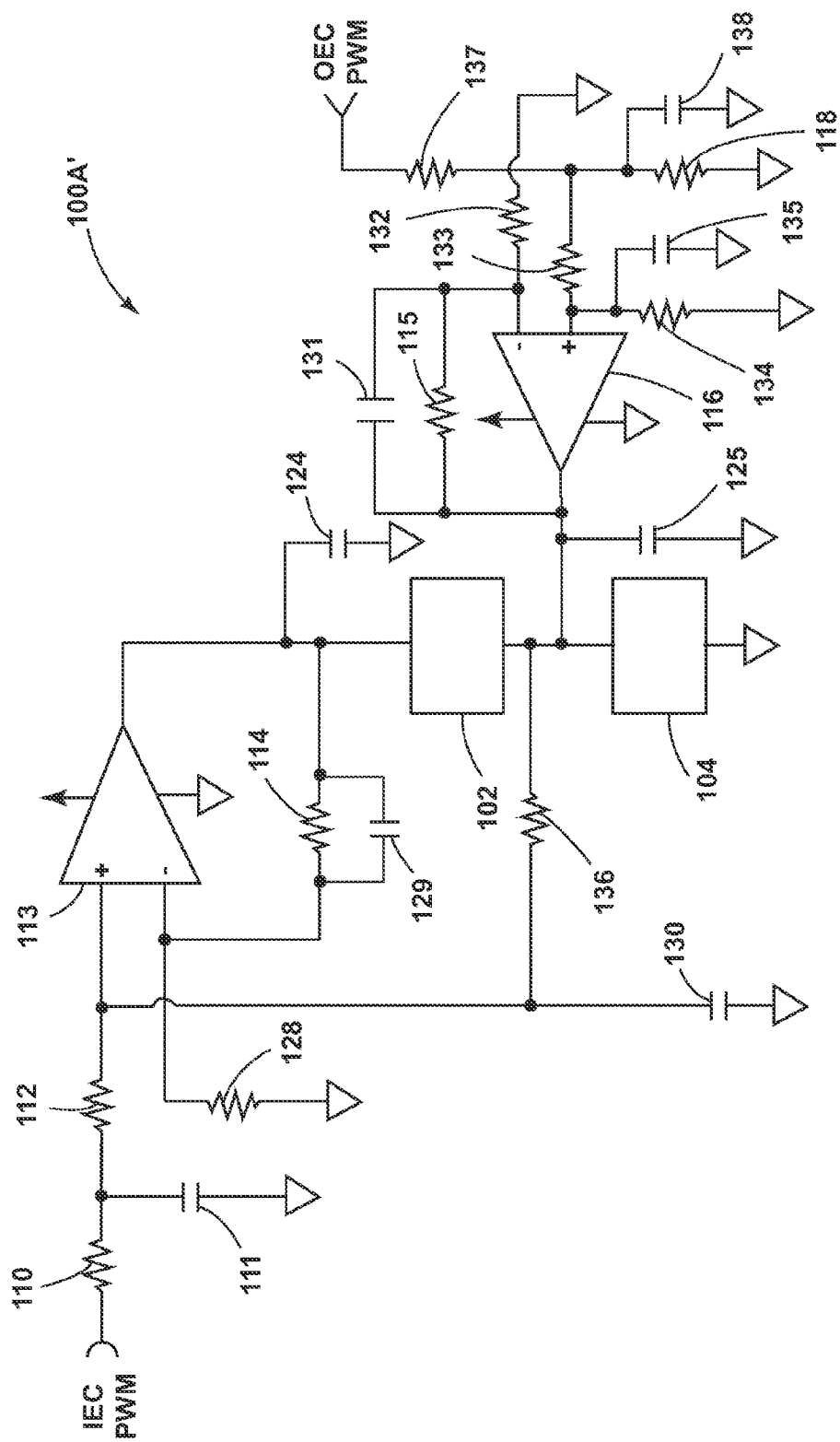
FIG. 8B is a modified schematic of the electro-optic rearview mirror system shown in 7A having two separate PWM signals, in accordance with one embodiment of the present invention.

Referring to FIGS. 8A and 8B, electro-optic rearview mirror systems 100A used in FIG. 6A and 100A' used in FIG. 7A are modified to receive two separate PWM signals. It should be appreciated that the modifications described below can also be applied to electro-optic rearview mirror systems 100B and 100B' of FIGS. 6B and 7B. As shown, a first PWM signal (IEC PWM) can be used to control the transmittance state of the inside electro-optic rearview mirror element 102 and a second PWM signal (OEC PWM) can be used to control the transmittance state of the outside electro-optic rearview mirror element 104. In this manner, the reflectance of the inside and outside electro-optic rearview mirror elements 102, 104 can be independently controlled. That is, the outside electro-optic rearview mirror element can be dimmed without dimming the inside electro-optic rearview mirror element, and vice versa. In both embodiments, capacitor 138 can be added to average the second PWM signal. Alternatively, instead of using PWM signals, digital-to-analog converters (DACs) can be used to set the target voltages for the inside and outside electro-optic rearview mirror elements 102, 104.

Figure 8C:
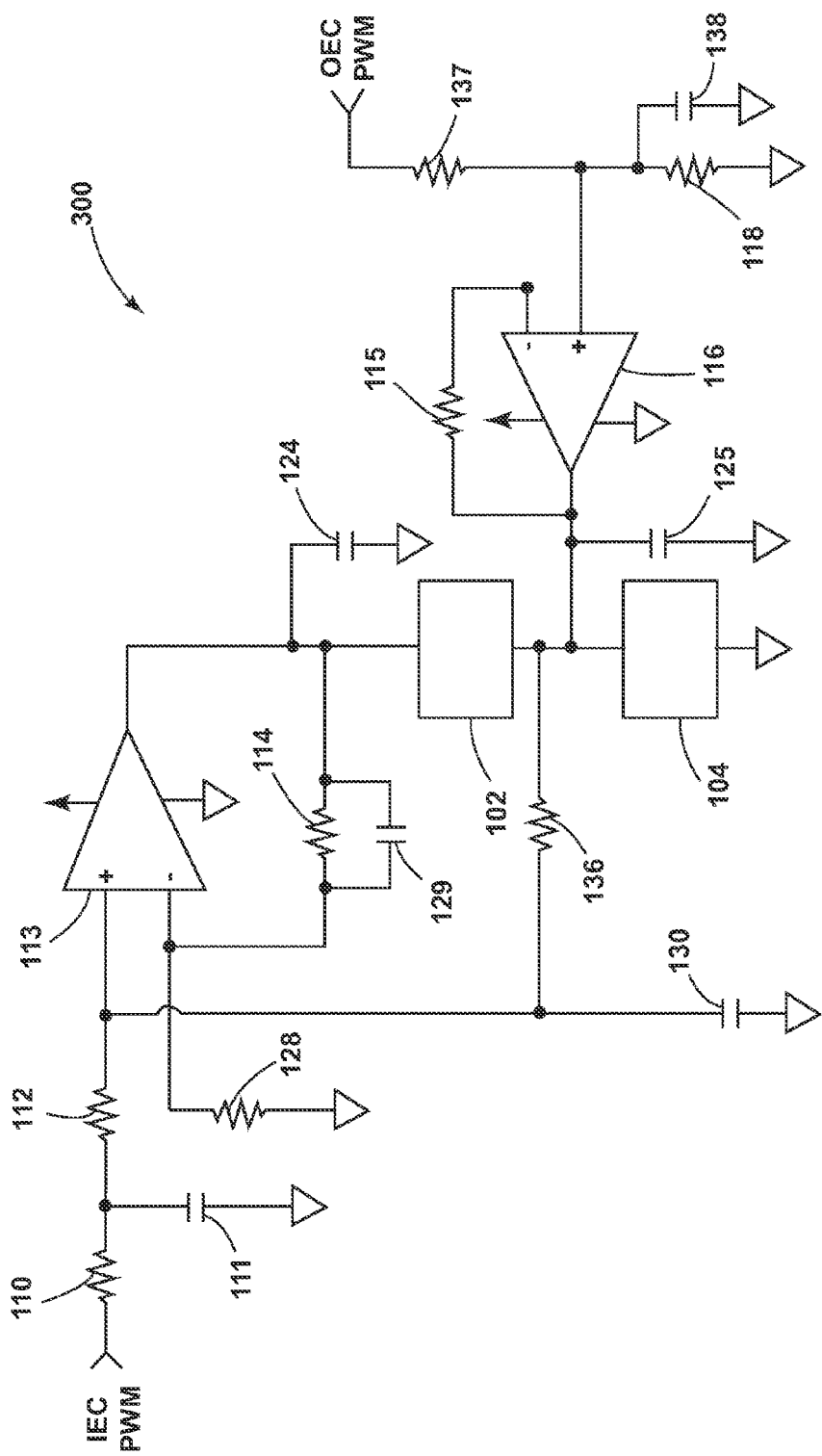
FIG. 8C is a schematic of an electro-optic rearview mirror system having two separate PWM signals in addition to one power op-amp configured as a differential amplifier and another power op-amp configured as a voltage follower, in accordance with one embodiment of the present invention.

In FIG. 8A the voltage at the junction of resistors 110 and 112 is the sum of the desired voltages for the inside and outside electro-optic rearview mirror elements 102, 104, while the voltage at the junction of resistors 118 and 137 is the desired voltage for the outside electro-optic rearview mirror element 104. Such a configuration may cause damage to the inside and outside electro-optic rearview mirror elements 102, 104 if the second PWM value is incorrect, such as in instances where a timing or software error occurs. Alternatively instead of using two power op-amps (113 and 116) configured as voltage followers, as shown in FIG. 8A, or two power op-amps (113 and 116) configured as differential amplifiers, as shown in FIG. 8B, an electro-optic system 300 can use one of each (i.e. a differential power op-amp (113) and a follower power op-amp (116)) as shown in FIG. 8C. With respect to FIGS. 8B and 8C, the first and second PWM signals are completely independent as the differential power op-amp 113, working in conjunction with resistors 110, 112, 136, and 114, ensures that the voltage across the inside electro-optic rearview mirror element 102 is only a function of the average first PWM voltage and is thus protected from software and timing errors.

Figure 9:
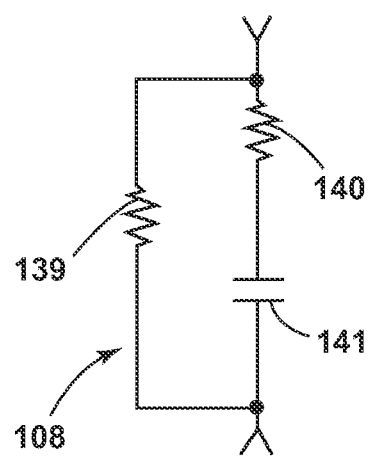
FIG. 9 is a schematic of an electrical representation of an electro-optic device, in accordance with one embodiment of the present invention.

In regards to FIG. 9, an exemplary schematic of an electrical representation of an electro-optic rearview mirror element 108 is shown, and may correspond to any of the electro-optic rearview mirror elements described herein. Resistor 139 models the steady state element load, while resistor 140 and capacitor 141 model the element inrush currents due to darkening or clearing.

Advantageously, the electro-optic rearview mirror systems shown in FIGS. 6A-8C can have a drive circuit with reduced PCB area and/or component count. However, those skilled in the art should appreciate that the electro-optic rearview mirror system can have additional or alternative advantages. Further, it should be appreciated by those skilled in the art that the above-described components can be combined in additional or alternative ways not explicitly described herein.

It will be appreciated that embodiments of the invention described herein may be comprised of one or more conventional processors and unique stored program instructions that control one or more processors to implement, in conjunction with certain non-processor circuits, some, most, or all of the functions of an electro-optic system, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

For purposes of the present disclosure, the electro-optic rearview mirror element can include an electrochromic medium having at least one solvent, at least one anodic material, and at least one cathodic material.

Typically, both of the anodic and cathodic materials are electroactive and at least one of them is electrochromic.

The electrochromic medium can be chosen from one of the following categories:

(I) Single-layer, single-phase—The electrochromic medium may comprise a single-layer of material which may include small non-homogenous regions, and include solution-phase devices where a material may be contained in solution in an ionically conducting electrolyte which remains in solution in the electrolyte when electrochemically oxidized or reduced. Solution-phase electroactive materials may be contained in the continuous solution-phase of a gel medium in accordance with the teachings of U.S. Pat. No. 5,928,572 entitled "Electrochromic Layer And Devices Comprising Same," and International Patent Application Ser. No. PCT/US98/05570 entitled "Electrochromic Polymeric Solid Films, Manufacturing Electrochromic Devices Using Such Solid Films, And Processes For Making Such Solid Films And Devices," both of which are hereby incorporated herein by reference in their entirety.

More than one anodic and cathodic material can be combined to give a pre-selected color as described in U.S. Pat. No. 5,998,617 entitled "Electrochromic Compounds," U.S. Pat. No. 6,020,987 entitled "Electrochromic Medium Capable Of Producing A Pre-selected Color," U.S. Pat. No. 6,037,471 entitled "Electrochromic Compounds," and U.S. Pat. No. 6,141,137 entitled "Electrochromic Media For Producing A Pre-selected Color," all of which are hereby incorporated herein by reference in their entirety including all references incorporated and/or cited therein.

The anodic and cathodic materials may also be combined or linked by a bridging unit as described in U.S. Pat. No. 6,241,916 entitled "Electrochromic System" and/or U.S. Pat. No. 6,519,072 entitled "Electrochromic Device," which are hereby incorporated herein by reference in their entirety including all references incorporated and/or cited therein. The electrochromic materials may also include near-infrared (NIR) absorbing compounds as described in U.S. Pat. No. 6,193,912 entitled "Near Infrared-Absorbing Electrochromic Compounds And Devices Comprising Same," which is hereby incorporated herein by reference in its entirety including all references incorporated and/or cited therein.

It is also possible to link anodic materials or cathodic materials by similar methods. The concepts described in these patents can further be combined to yield a variety of electroactive materials that are linked or coupled, including linking of a redox buffer, such as linking of a color-stabilizing moiety, to an anodic and/or cathodic material.

The anodic and cathodic electrochromic materials can also include coupled materials as described in U.S. Pat. No. 6,249,369 entitled "Coupled Electrochromic Compounds With Photostable Dictation Oxidation States," which is hereby incorporated herein by reference in its entirety including all references incorporated and/or cited therein.

The concentration of the electrochromic materials can be selected as taught in U.S. Pat. No. 6,137,620 entitled "Electrochromic Media With Concentration Enhanced Stability, Process For The Preparation Thereof and Use In Electrochromic Devices," which is hereby incorporated herein by reference in its entirety including all references incorporated and/or cited therein.

Additionally, a single-layer, single-phase medium may include a medium where the anodic and cathodic materials are incorporated into a polymer matrix as is described in International Patent Application Serial No. PCT/EP98/03862 entitled "Electrochromic Polymer System," and International Patent Application Serial No. PCT/US98/05570 entitled "Electrochromic Polymeric Solid Films, Manufacturing Electrochromic Devices Using Such Solid Films, And Processes For Making Such Solid Films And Devices," which is hereby incorporated herein by reference in its entirety including all references incorporated and/or cited therein.

(II) Multi-layer—The electrochromic medium may also be prepared in layers and include a material attached directly to an electrically conducting electrode or confined in close proximity thereto which remains attached or confined when electrochemically oxidized or reduced.

(III) Multi-phase—The electrochromic medium may further be prepared using multiple phases where one or more materials in the medium undergoes a change in phase during the operation of the device, for example a material contained in solution in the ionically conducting electrolyte forms a layer on the electrically conducting electrode when electrochemically oxidized or reduced.

In describing the order of elements or components in embodiments of a vehicular rearview assembly or a sub-set of a vehicular rearview assembly, the following convention will be generally followed herein, unless stated otherwise. The order in which the surfaces of sequentially positioned structural elements of the assembly (such as substrates made of glass or other translucent material) are viewed is the order in which these surfaces are referred to as the first surface, the second surface, the third surface, and other surfaces if present referred to in ascending order. Generally, therefore, surfaces of the structural elements (such as substrates) of an embodiment of the invention are numerically labeled starting with a surface that corresponds to the front portion of a rearview assembly and that is proximal to the observer or user of the assembly and ending with a surface that corresponds to the back portion of an assembly and that is distal to the user. Accordingly, the term "behind" refers to a position, in space, following something else and suggests that one element or thing is at the back of another as viewed from the front of the rearview assembly. Similarly, the term "in front of" refers to a forward place or position, with respect to a particular element as viewed from the front of the assembly.

Generally, embodiments of the invention may be configured to define a convex element, an aspheric element, a planar element, a non-planar element, an element having a wide field of view (FOV), or a combination of these various configurations in different areas to define a mirror element with generally complex shape. In the case of an electrochromic rearview mirror assembly, the first surface of the first substrate may comprise a hydrophilic or hydrophobic coating to improve the operation. The embodiments of the reflective elements may comprise an anti-scratch layer on the exposed surfaces of at least one of the first and second substrates. Examples of various reflective elements are described in U.S. Pat. Nos. 5,682,267, 5,689,370, 5,825,527, 5,940,201, 5,998,617, 6,020,987, 6,037,471, 6,057,956, 6,062,920, 6,064,509, 6,111,684, 6,166,848, 6,193,378, 6,195,194, 6,239,898, 6,246,507, 6,268,950, 6,356,376, 6,441,943, and 6,512,624. The disclosure of each of these patents is incorporated herein in its entirety by reference.

The present invention may be used with a mounting system such as that described in U.S. Pat. Nos. 8,201,800; 8,210,695; U.S. Patent Application Publication Nos. 2012/0327234; 2012/0218655, U.S. Pat. Nos. 8,925,891, 9,174,577; 8,960,629; 9,244,249, and U.S. Provisional Patent Application No. 61/704,869, which are hereby incorporated herein by reference in their entireties. Further, the present invention may be used with a rearview packaging assembly such as that described in U.S. Pat. No. 8,264,761; U.S. Pat. Nos. 8,885,240; 8,646,924; 8,814,373; and 8,643,931, U.S. Pat. Nos. 9,056,584; and 9,316,347, and U.S. Provisional Patent Application No. 61/707,625, which are hereby incorporated herein by reference in their entirety. Additionally, it is contemplated that the present invention can include a bezel such as that described in U.S. Pat. Nos. 8,201,800; 8,210,695; and U.S. Pat. No. 8,827,517, which is hereby incorporated herein by reference in its entirety.

Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

What is claimed is:

1. An electro-optic rearview mirror system comprising:
an inside electro-optic rearview mirror element;
an outside electro-optic rearview mirror element electrically connected with the inside electro-optic rearview mirror element such that at least a portion of current flows from the inside electro-optic rearview mirror element to the outside electro-optic rearview mirror element via a line connecting the inside and outside electro-optic rearview mirror elements; and
a drive circuit in electrical communication with the inside electro-optic rearview mirror element and the outside electro-optic rearview mirror element and comprising a first power operational amplifier and a second power operational amplifier, both of which are configured as voltage followers, wherein the first power operational amplifier is configured to provide a current to the inside and outside electro-optic rearview mirror elements, and wherein the second power operational amplifier is electrically connected to the line connecting the inside and outside electro-optic rearview mirror elements and is configured to control a voltage at a center point of the inside and outside electro-optic rearview mirror elements.

2. The electro-optic rearview mirror system of claim 1, wherein the drive circuit further comprises a second outside electro-optic rearview mirror element electrically connected in series with a ground side of the outside electro-optic rearview mirror element.

3. The electro-optic rearview mirror system of claim 2, wherein the drive circuit further comprises a third power operational amplifier configured as a voltage follower that stabilizes a voltage at a center point of the outside electro-optic rearview mirror element and the second electro-optic rearview mirror element.

4. The electro-optic rearview mirror system of claim 1, wherein the drive circuit is configured to receive one of an input pulse-width modulation duty cycle and a digital-to-analog converter voltage that is reduced to approximately zero volts to initiate clearing of the inside and outside electro-optic rearview mirror elements.

5. The electro-optic rearview mirror system of claim 1, wherein the drive circuit is configured to receive a first pulse-width modulation signal for independently controlling a transmittance state of the inside electro-optic rearview mirror element and a second pulse-width modulation signal for independently controlling a transmittance state of the outside electro-optic rearview mirror element.

6. The electro-optic rearview mirror system of claim 5, wherein the drive circuit is further configured to average the second pulse-width modulation signal.

7. An electro-optic rearview mirror system comprising:
an inside electro-optic rearview mirror element;
an outside electro-optic rearview mirror element electrically connected with the inside electro-optic rearview mirror element such that at least a portion of current flows from the inside electro-optic rearview mirror element to the outside electro-optic rearview mirror element via a line connecting the inside and outside electro-optic rearview mirror elements; and a drive circuit in electrical communication with the inside electro-optic rearview mirror element and the outside electro-optic rearview mirror element and comprising a first power operational amplifier and a second power operational amplifier, wherein the first power operational amplifier is electrically connected to the inside electro-optic rearview mirror element and the second power operational amplifier is electrically connected to the line connecting the inside and outside electro-optic rearview mirror elements, and wherein the drive circuit is configured to differentially sense a voltage associated with the inside electro-optic rearview mirror element such that if the outside electro-optic rearview mirror element is shorted, a voltage associated with the inside electro-optic rearview mirror element remains substantially unchanged.

8. The electro-optic rearview mirror system of claim 7, wherein the inside electro-optic rearview mirror element comprises an inside electrochromic mirror element and the outside electro-optic rearview mirror element comprises an outside electrochromic mirror element.

9. The electro-optic rearview mirror system of claim 7, wherein the drive circuit comprises a first power operational amplifier and a second power operational amplifier, both of which are configured as differential amplifiers.

10. The electro-optic rearview mirror system of claim 7, wherein the drive circuit is configured to receive one of an input pulse-width modulation duty cycle and a digital-to-analog converter voltage that is reduced to approximately zero volts to initiate clearing of the inside and outside electro-optic rearview mirror elements.

11. The electro-optic rearview mirror system of claim 7, wherein the drive circuit is configured to receive a first pulse-width modulation signal for independently controlling a transmittance state of the inside electro-optic rearview mirror element and a second pulse-width modulation signal for independently controlling a transmittance state of the outside electro-optic rearview mirror element.

12. The electro-optic rearview mirror system of claim 11, wherein the drive circuit further comprises a first power operational amplifier configured as a differential amplifier and a second power operation amplifier configured as a voltage follower, further wherein a voltage across the inside electro-optic rearview mirror element is a function of an average voltage of the first pulse-width modulation signal.

13. The electro-optic rearview mirror system of claim 12, wherein the drive circuit is further configured to average the second pulse-width modulation signal.

14. An electro-optic rearview mirror system comprising:
a drive circuit for driving an inside electro-optic rearview mirror element and at least one outside electro-optic rearview mirror element of a vehicle, the vehicle having an ambient light sensor and a glare light sensor, the drive circuit comprising:
a controller responsive to outputs of the ambient light sensor and the glare light sensor for generating voltage control signals, the controller further generating a selection signal for alternatingly selecting one of the inside and outside electro-optic rearview mirror elements;
a variable voltage source for generating a drive voltage by discharging a capacitor; and
a selection circuit coupled to the variable voltage source for receiving the drive voltage, the selection circuit also coupled to the controller for receiving the selection signal, the selection circuit comprising a first selection switch disposed between the capacitor and the inside electro-optic rearview mirror element and a second selection switch disposed between the outside electro-optic rearview mirror element and ground, wherein the first selection switch selectively enables the drive voltage to be applied across the inside electro-optic rearview mirror element and the second selection switch selectively enables the drive voltage to be applied across the outside electro-optic rearview mirror element.

15. The electro-optic rearview mirror system of claim 14, wherein the variable voltage source includes a first power transistor and a second power transistor connected in series.

16. The electro-optic rearview mirror system of claim 14, wherein the at least one outside electro-optic rearview mirror element comprises a first outside electro-optic rearview mirror element in parallel with a second outside electro-optic rearview mirror element.

17. The electro-optic rearview mirror system of claim 14, wherein the selection signal comprises a periodic square wave with a fixed duty cycle.

18. The electro-optic rearview mirror system of claim 14, wherein if the controller detects that the outside electro-optic rearview mirror element is shorted, the controller stops applying the drive voltage to the outside electro-optic rearview mirror element while continuing to apply the selection signal to the first selection switch to allow for continued operation of the inside electro-optic rearview mirror element.

19. The electro-optic rearview mirror system of claim 18, further comprising a protection circuit configured to prevent the second selection switch from applying the drive voltage to the outside electro-optic rearview mirror element when the outside electro-optic rearview mirror element is shorted.

20. The electro-optic rearview mirror system of claim 14, wherein the controller comprises a microprocessor, a switch mode power supply, and a voltage regulator, all of which are provided on an integrated circuit chip.

* * * * *